No. 679,550. Patented July 30, 1901.
G. CARLSON.
STARCH PRINTER.
(Application filed Jan. 4, 1901.)

(No Model.) 2 Sheets—Sheet 1.

Witnesses
Edward F. Rowland
S. S. Bradshaw

Gabriel Carlson Inventor
By his Attorney A. M. Pierce.

No. 679,550. Patented July 30, 1901.
G. CARLSON.
STARCH PRINTER.
(Application filed Jan. 4, 1901.)
(No Model.) 2 Sheets—Sheet 2.

Witnesses
Edward Rowland
J. F. Bradshaw

Gabriel Carlson,
Inventor
By his Attorney A. M. Pierce

UNITED STATES PATENT OFFICE.

GABRIEL CARLSON, OF SPRINGFIELD, MASSACHUSETTS, ASSIGNOR TO THE CONFECTIONERS' MACHINERY AND MANUFACTURING COMPANY, OF SAME PLACE.

STARCH-PRINTER.

SPECIFICATION forming part of Letters Patent No. 679,550, dated July 30, 1901.

Application filed January 4, 1901. Serial No. 42,123. (No model.)

*To all whom it may concern:*

Be it known that I, GABRIEL CARLSON, a citizen of the United States, residing at Springfield, county of Hampden, and State of Massachusetts, have invented a new and useful Improvement in Starch-Printers, of which the following is a specification.

My invention relates especially to devices employed for producing mold-forms in starch and kindred molding material, and has for its object the provision of a printing-machine very simple in construction and effective in operation.

To attain the desired end, my invention consists, essentially, in certain novel and useful combinations or arrangements of parts and peculiarities of construction and operation, all of which will be hereinafter first fully described, and then pointed out in the claims.

Figure 1:
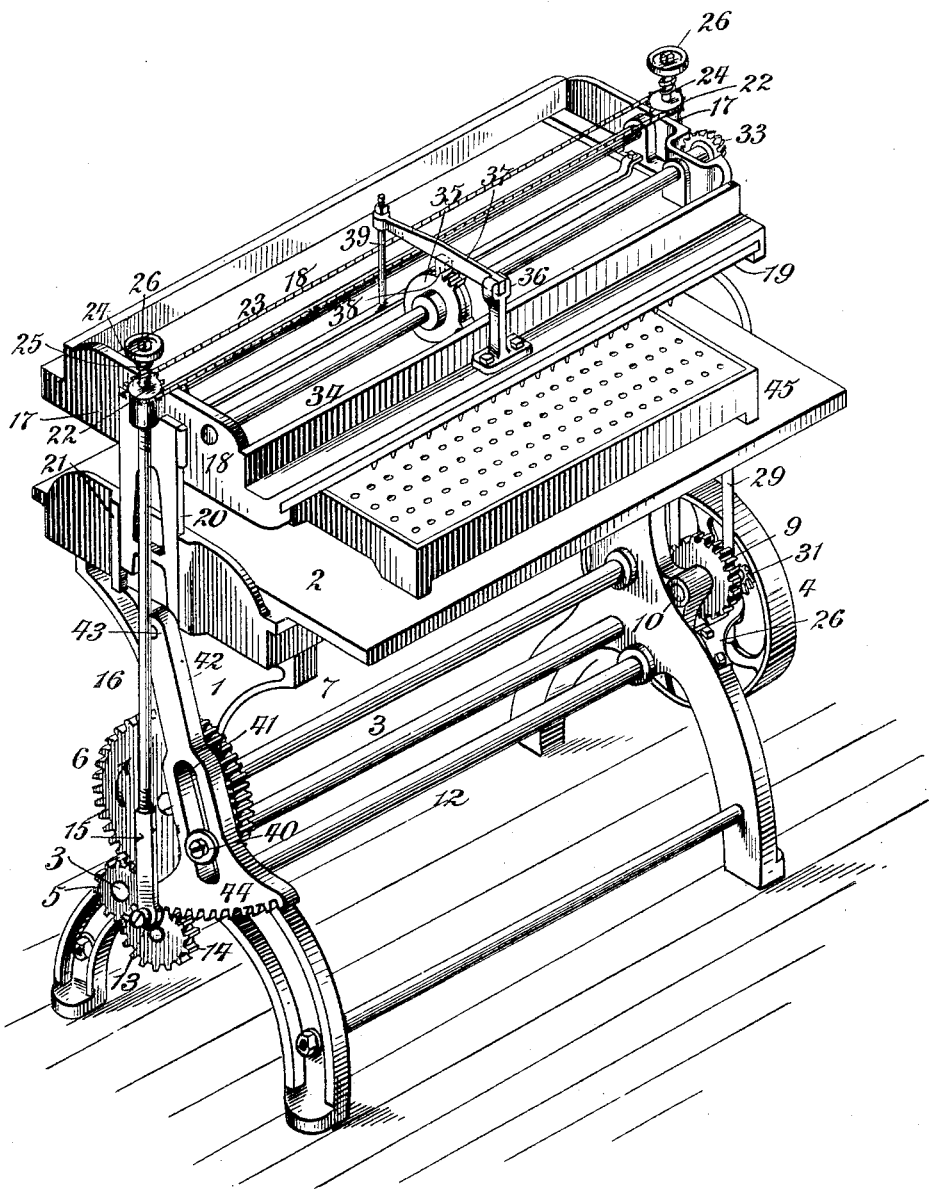
Figure 2:
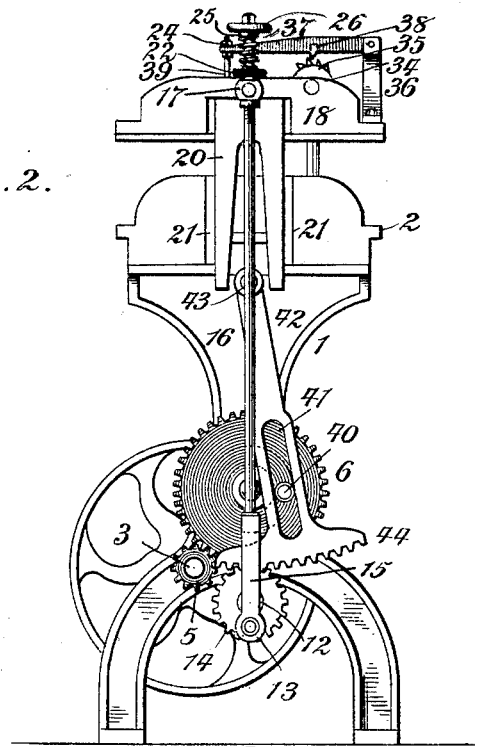
Figure 3:
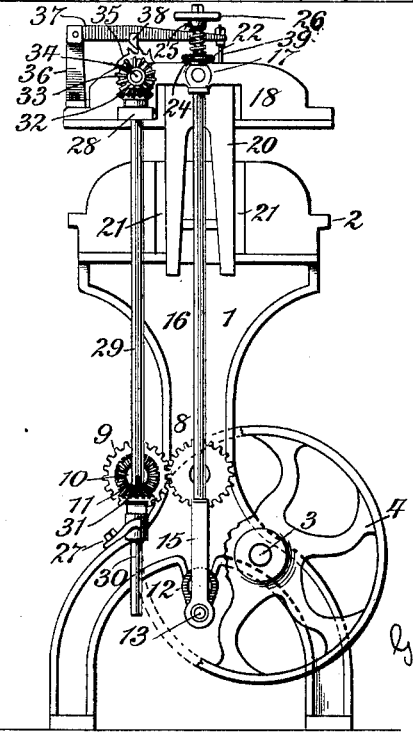

In the accompanying drawings, forming a part hereof, Figure 1 is a perspective view of a printing-machine embodying my invention. Fig. 2 is an end elevation looking from the left of Fig. 1, and Fig. 3 is a like view looking from the right of the same figure.

Similar numerals of reference wherever they occur indicate corresponding parts in all the figures.

1 is the main frame of the machine, having a table or platform 2. Mounted in bearings in the main frame is a driving-shaft 3, carrying upon one extremity a driving clutch-wheel 4 for supplying the requisite power. Upon the other extremity of the shaft 3 is fixed a gear 5, the teeth whereof mesh with the teeth of a gear 6 upon a shaft 7, journaled in the main frame. 8 is a gear fixed upon the opposite extremity of the shaft 7, the teeth whereof mesh with a gear 9 upon a stud 10, fixed to the main frame. This gear 9 carries a bevel-gear 11, the use of which will be hereinafter explained.

12 is a shaft journaled in the main frame and bearing at each extremity a crank 13.

14 is a gear upon the shaft 12.

Mounted upon the cranks 13 are pitmen 15, screw-threaded for the reception of connecting-rods 16, which extend to and through pivotal bearings 17 upon each end of a platen 18, arranged for carrying a printing-form 19, as illustrated in Fig. 1 of the drawings.

20 represents guides secured to the platen and arranged to play in ways 21 in the main frame.

Near the upper end of each rod 16, above the bearings 17, is a sprocket-wheel 22, having a key which permits longitudinal movement only upon the rod, the two wheels being connected by a sprocket-chain 23.

24 represents springs surrounding the rods 16, bearing against the sprocket-wheels and check-nuts 25.

26 represents hand-wheels secured to the upper ends of the rods 16. By this arrangement the rods 16 may be turned simultaneously, adjusting the platen as required. The springs 24 permit the platen to be forced upward in case of poor adjustment, preventing possibility of accident.

27 is a journal-bearing fixed on the main frame, and 28 is a corresponding bearing upon the platen 18. 29 is a perpendicular shaft journaled in said bearings.

30 is a keyway in the shaft 29, and 31 is a bevel-gear provided with a spline which takes in said keyway, while permitting longitudinal movement of the shaft 29. The gear 31 meshes with the gear 11.

32 is a bevel-gear secured upon the upper extremity of the shaft 29 above the bearing 28, this gear meshing with a corresponding gear 33 upon a shaft 34, journaled upon the platen 18.

35 is a ratchet upon the shaft 34.

36 is an arm extending upward from the platen 18, wherein is pivoted a hammer-arm 37, carrying a tooth 38, arranged to contact with the ratchet 35. The free end of the arm 37 is provided with a vertical rod or head 39, arranged to strike upon the top of the platen, this arrangement constituting a vibratory hammer, as particularly illustrated in Fig. 1 of the drawings. This arrangement is designed for giving a slight vibration to the platen and connected printing-form when the same is depressed, the entire vibrating mechanism being carried by and reciprocating with the platen, the loose bevel-gear 31 permitting such rising and falling movement of the shaft 29, which rotates continuously while the machine is moving.

Fixed to the gear 6 is a stud 40, which projects through a slot 41 in an arm 42, pivoted at 43 and having at its lower extremity a toothed segment 44, the teeth whereof mesh with the gear 14 upon the crank-shaft 12. By this construction the stud 40, moving in the slot 41 in the direction indicated by the arrow in Fig. 1, will travel farther away from the pivotal point 43, producing a slow motion of the segment and for a moment practically a dead-center. As the stud continues its movement the speed of the crank-shaft will increase as the platen moves upward. The slow motion is produced at the time when the printing-form is being forced into the starch in the molding-tray, permitting the same to move very slowly, as is desirable at this point and while the vibrator is working. The stud 40 travels as indicated by the dotted circles in Fig. 2, and when it reaches the position opposite to that shown the movement of the platen will again be accelerated. This form of mechanism produces a steady pressure like that exerted by hand without any of the irregular jerky movements which occur where cams are employed. There are practically two dead-centers or dwells, one produced by the movement of the stud 40 and the other by the crank 13.

45 represents a starch-tray constructed in the usual manner. In Figs. 2 and 3 the tray 45 and the printing-form 19 are removed.

Having now fully described my invention, what I claim as new therein, and desire to secure by Letters Patent, is—

1. In a machine of the character herein specified, the combination with the vertically-movable platen, of rods pivotally connected therewith and with a crank-shaft; a gear upon said shaft; a toothed segment engaging with said gear, and means for oscillating said toothed segment, substantially as shown and described.

2. In a machine of the character herein specified, the combination with the vertically-movable platen, of rods pivotally connected therewith and with a crank-shaft; a gear upon said shaft; a slotted bar pivoted at one extremity to the main frame, its other extremity consisting of a toothed segment engaging with the gear upon the crank-shaft; a stud fixed in a revoluble wheel engaging in the slot in the pivoted bar, the whole arranged to operate, substantially as shown and described.

3. In a machine of the character herein specified, a vertically-movable platen, in combination with crank-rods and operating mechanism therefor, said crank-rods being provided with means for simultaneous longitudinal adjustment, substantially as shown and described.

4. In a machine of the character herein specified, a vertically-movable platen; crank-rods pivotally connected therewith, the crank-rods being divided and the parts screw-threaded to engage with each other; springs upon said crank-rods; sprocket-wheels mounted upon said rods and connected with each other by a sprocket-chain, and a hand-wheel upon the end of the said rods, the whole combined and arranged to operate, substantially as shown and described.

5. In a machine of the character herein specified, vibrating mechanism mounted upon and carried by the movable platen, in combination with means for actuating said vibrating mechanism, also carried by and moving vertically only with the platen, substantially as shown and described.

6. In a machine of the character herein specified, a vibratory hammer; a shaft carrying a ratchet arranged to contact with a tooth fixed to the hammer-arm, and also carrying a bevel-gear, and a perpendicular shaft journaled in a bearing and carrying a bevel-gear at its upper extremity which engages with the first-mentioned bevel-gear, all of said parts being carried by the movable platen, in combination with an actuating bevel-gear so fixed upon the perpendicular shaft as to permit longitudinal movement thereof, and means for rotating said gear, substantially as shown and described.

7. In a machine of the character herein specified, a vertically-movable platen, in combination with means for reciprocating the same with diminished speed near the end of the stroke, and with still further diminished speed at the beginning of the return of the stroke, substantially as shown and described.

Signed by me at Springfield, Massachusetts, this 27th day of December, 1900.

GABRIEL CARLSON.

Witnesses:
H. H. BOWMAN,
RALPH P. ALDEN.